April 24, 1962 J. K. O'NEIL 3,031,570

SIGNAL RECEIVING SYSTEM

Filed Jan. 16, 1959 2 Sheets-Sheet 1

INVENTOR.
JOHN K. O'NEIL

BY Shanley & O'Neil
ATTORNEY

April 24, 1962 J. K. O'NEIL 3,031,570

SIGNAL RECEIVING SYSTEM

Filed Jan. 16, 1959 2 Sheets-Sheet 2

INVENTOR.
JOHN K. O'NEIL

BY Shanley & O'Neil

ATTORNEY 3,031,570
SIGNAL RECEIVING SYSTEM

John K. O'Neil, % San Juan Engineering Service Company, 47 Nichols Ave., Friday Harbor, Wash.
Filed Jan. 16, 1959, Ser. No. 787,249
3 Claims. (Cl. 250—20)

This invention relates to improvements on signal receiving systems and more particularly to a novel arrangement for simultaneous reception of signals at different frequencies.

In certain circumstances it is necessary to provide apparatus tunable to receive different frequencies within a certain frequency band while at the same time being operable to receive signals at a preselected frequency within the frequency band. For example, the Federal Communications Commission has allotted the 1600–3500 kc. band to ship radiotelephone stations and has designated 2182 kc. as the distress frequency which must be maintained on efficient listening watch when the station is open. This necessarily requires equipment capable of simultaneously receiving signals at different frequencies.

Prior to the present invention it has been customary to employ two receivers in order to meet the foregoing requirements, one receiver being tunable to the various frequencies in the 1600–3500 kc. band, such as 2003 kc., 2638 kc., 2738 kc., and 2830 kc., and a second receiver at all times tuned to the distress frequency of 2182 kc. The use of two separate receivers for this purpose has not proven satisfactory due to the expense of two receivers and the inconvenience of using two receivers and especially since adequate operation of the tunable receiver has not been achieved due to interference from the pretuned receiver.

It is therefore an object of the present invention to provide a novel signal receiving system that overcomes the foregoing problems.

Another object is to provide a novel apparatus for simultaneously receiving two signals at different frequencies.

Still another object is to provide a signal channel tunable through a predetermined frequency band and an interconnected signal channel tuned to a preselected frequency designed in a novel manner to prevent interferece between the signal channels.

A still further object is to provide a novel signal channel tuned to a preselected frequency with novel means for interconnection with a receiver tunable throughout a predetermined frequency band.

Other objects and features of the present invention will appear more fully from the following detailed description considered in connection with the accompanying drawings which disclose several forms of the invention. It is to be expressely understood however that the drawings are designed for purposes of illustration only and not as a definition of the limits of the invention, reference for the latter purpose being had to the appended claims.

In the drawings, in which similar reference characters denote similar elements throughout the several views:

FIGURE 2 is a diagrammatic presentation of another portion of signal receiving apparatus incorporating features of the present invention;

FIGURE 3 is a diagrammatic presentation of another feature of the present invention.

Briefly, the present invention provides a novel signal receiving system including radio frequency channel tuned to a predetermined frequency and a novel adaptor arrangement providing operative connections with a parent receiver, the system including novel features preventing interference.

Figure 1:
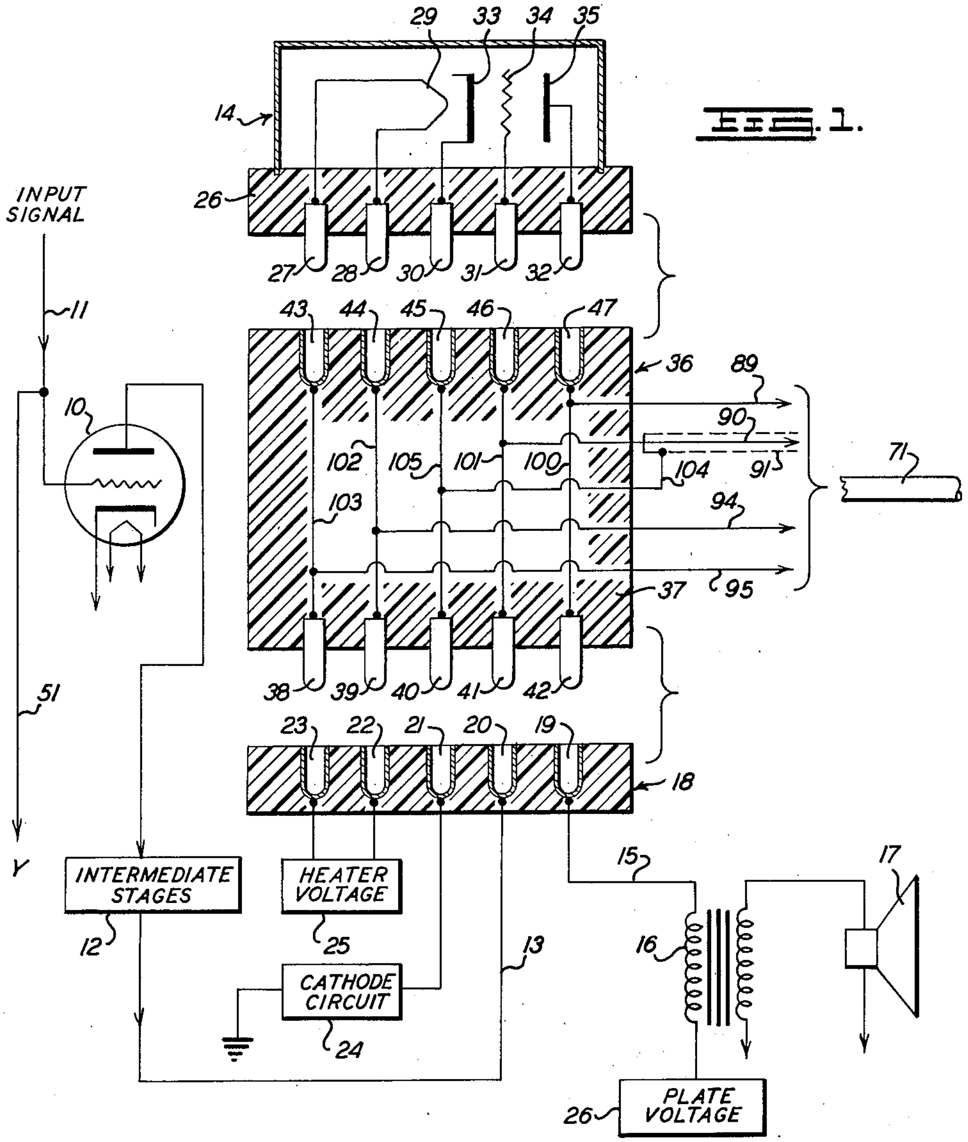
FIGURE 1 is a diagrammatic presentation of a portion of signal receiving apparatus incorporating the principles of the present invention.

With reference more particularly to FIGURE 1 of the drawings, a radio receiver of conventional superheterodyne design is diagrammatically shown therein including a radio frequency input stage represented by tube 10 fed with an input signal from lead 11 which may be connected to a signal source such as an antenna system. The output of tube 10 is fed to intermediate stages 12 of the receiver, the intermediate stages including a local oscillator, IF amplifier and detector, all of which may be of conventional design. The output of the intermediate stages is fed through lead 13 to the input of the receiver output tube 14 and the output of the latter tube is fed through lead 15 to transformer 16 and speaker 17. Socket 18, provided in the conventional receiver for the output tube 14, includes female connectors 19, 20, 21, 22 and 23, connectors 19 and 20 being joined to leads 15 and 13, respectively, connector 21 being joined to cathode circuit 24 and connectors 22 and 23 being joined to heater voltage supply 25. Plate voltage source 26 is connected through the primary of transformer 16 and lead 15 to the connector 19 of socket 18. The heater voltage source 25 and the plate voltage source 26 are connected, through leads not shown, to supply proper voltages to elements of the input tube 10 and to elements of the tubes of the intermediate stages 12 in a conventional manner.

The output tube 14 is provided with a base 26 carrying pins 27 and 28 connected to the heater 29 and pins 30, 31 and 32 connected to the cathode 33, grid 34 and plate 35, respectively, of the tube 14. During normal operation of the conventional receiver described above, the pins 27, 28, 30, 31 and 32 are adapted to enter the female connectors 23, 22, 21, 20 and 19, respectively, of the socket 18, to properly connect the tube 14 in the output circuit of the receiver. However, in accordance with the principles of the present invention, for reasons that will be described more fully below, connections between the female connectors of the socket 18 and respective pins of the output tube are established through an adaptor 36, the adaptor 36 includes a block 37 of insulating material carrying on its lower side, as viewed in the drawing, a plurality of downwardly projecting pins 38, 39, 40, 41 and 42 positioned to be received by female connectors 23, 22, 21, 20 and 19, respectively, of the tube socket 18. On its other side the block 37 supports a plurality of female connectors 43, 44, 45, 46 and 47 each joined to corresponding pins 38, 39, 40, 41 and 42, respectively, and each adapted to receive pins 27, 28, 30, 31 and 32 respectively, of the tube 14. When the adaptor 36 is plugged into the tube socket 18 and the tube 14 is plugged into the adaptor 36, in the manner indicated in the drawings and described above, the receiver will operate in a conventional manner. It is to be understood that the base of the output tube 14 and its socket 18 may be of conventional design in which the female connector and the pins lie on a circle and that the adaptor 36 may be constructed in a similar manner so that the pins and the female connectors thereof are located on corresponding circles and are angularly positioned to enter the female connector of the tube socket and to receive the pins of the tube base. Furthermore, it is to be understood that the output tube may include elements in addition to those illustrated and may constitute a portion of a multiple purpose tube, such elements and arrangements being deleted in order to simplify the drawings.

The portion of the signal receiving apparatus provided by the present invention and shown in FIGURE 2 includes a compact superheterodyne receiver of high sensitivity and selectivity which is capable of producing sufficient power to drive the audio output stage of a conventional receiver. As illustrated, an input signal is fed to input transformer 50 by connector lead 51 joined to the lead 11 feeding the input signal to the receiver of FIGURE 1. The output of transformer 50 is fed to the input of the left hand section of multipurpose tube 52 where the signal is mixed with the output of crystal controlled local oscillator comprising the right hand section of tube 52. The resulting intermediate frequency output is coupled through transformer 53 to an intermediate frequency amplifier including the left hand section of multipurpose tube 54. The amplified intermediate frequency output is coupled through transformer 55 to second detector 56, such as a germanium diode, used to provide automatic gain control. The detector output is then fed through potentiometer 57 and lead 58 to an audio frequency driver including the right hand section of multipurpose tube 54, the output from the driver being by way of lead 59. The plate voltage circuits of the multipurpose tubes 52 and 54 include common conductor 60, while the heater circuits for the tubes include conductors 61, 62, 63 and 64. The heater circuits include double pole "on-off" switch 65 ganged to the potentiometer 57.

The signal output conductor 59 and the voltage supply conductors 60, 61, 62, 63 and 64 are connected through socket and plug device 70 to a multiconductor cable 71, and as shown in FIGURE 1, the cable 71 terminates at the adaptor 36 with the individual conductors thereof being connected by means of the adaptor to appropriate pins of the tube 14 or female connectors of the tube socket 18 so that the power requirements of the preselected receiving channel are supplied from the parent receiver and so that the output of the preselected receiving channel is fed to the input of the audio output of the parent receiver. As shown in FIGURE 2, the plug and socket device 70 includes a plug member 72 carrying a plurality of projecting pins 73, 74, 75, 76, 77, 78 and 79, and a socket member 80 providing a plurality of female connectors 81, 82, 83, 84, 85, 86 and 87 adapted to receive pins 73, 74, 75, 76, 77, 78 and 79, respectively, of the plug member 72. The pin 77 is connected to the signal output conductor 59 and the pin 79 is connected to the common plate voltage conductor 60, while the pin 78 is connected to ground potential through lead 88. Furthermore, pins 74 and 76 are connected in the heater circuit of tube 54 while pins 73 and 75 are connected in the heater circuit for the tube 52. With respect to the socket member 80, connector 87 is joined to conductor 89 and connector 85 is joined to conductor 90 provided with a shielded cable 91 connected through lead 92 to connector 86 and hence to ground. Connectors 82 and 83 are joined to conductors 93 and 94, respectively, and for a purpose that will appear more fully below, connectors 81 and 84 are connected together through lead 95. Also, condenser 96 is connected between conductors 83 and 85. The conductors 89, 90, 93 and 94, with the conductor 90 being provided with the shield 91, are formed into composite cable 71, and, as shown in FIGURE 1, the other end of the cable terminates at the adaptor 36 with the conductor 89 being joined to lead 100 common with the plate 35 of the output tube 14 and the plate voltage source 26; the conductor 90 being joined to lead 101 common with the grid 34 of the output tube 14 and the lead 13 feeding the output signal from the parent receiver, and with conductors 93 and 94 being joined to leads 102 and 103 in common with the heater voltage source 25 and the heater terminals of the output tube 14. The other end of the cable shield 91 is connected through conductor 104 to lead 105 common with the cathode 33 of the output tube and the cathode circuit 24. With this arrangement voltage for the plates of tubes 52 and 54 of the preselected receiving channel is derived from the plate voltage source 26 of the parent receiver and heater voltage for the tubes 52 and 54 is derived from heater voltage source 25 of the parent receiver. Furthermore, the output signal from the preselected receiving channel is fed by this arrangement to the input of the output tube 14 of the parent receiver and any intelligence received through the preselected channel is fed through the output of the parent receiver. In addition, the necessary shielding of the signal carrying conductor 90 is also obtained by the novel adaptor arrangement of the present invention.

Figure 4:
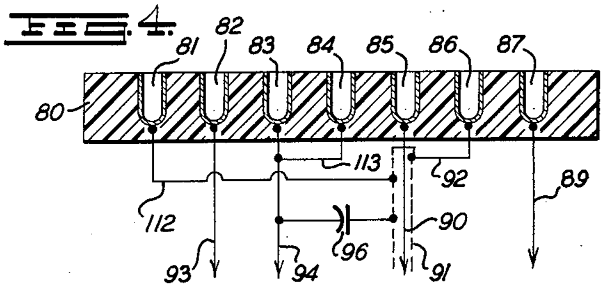
FIGURE 4 is a diagrammatic showing of a further feature of the present invention.
Figures 4, 5:
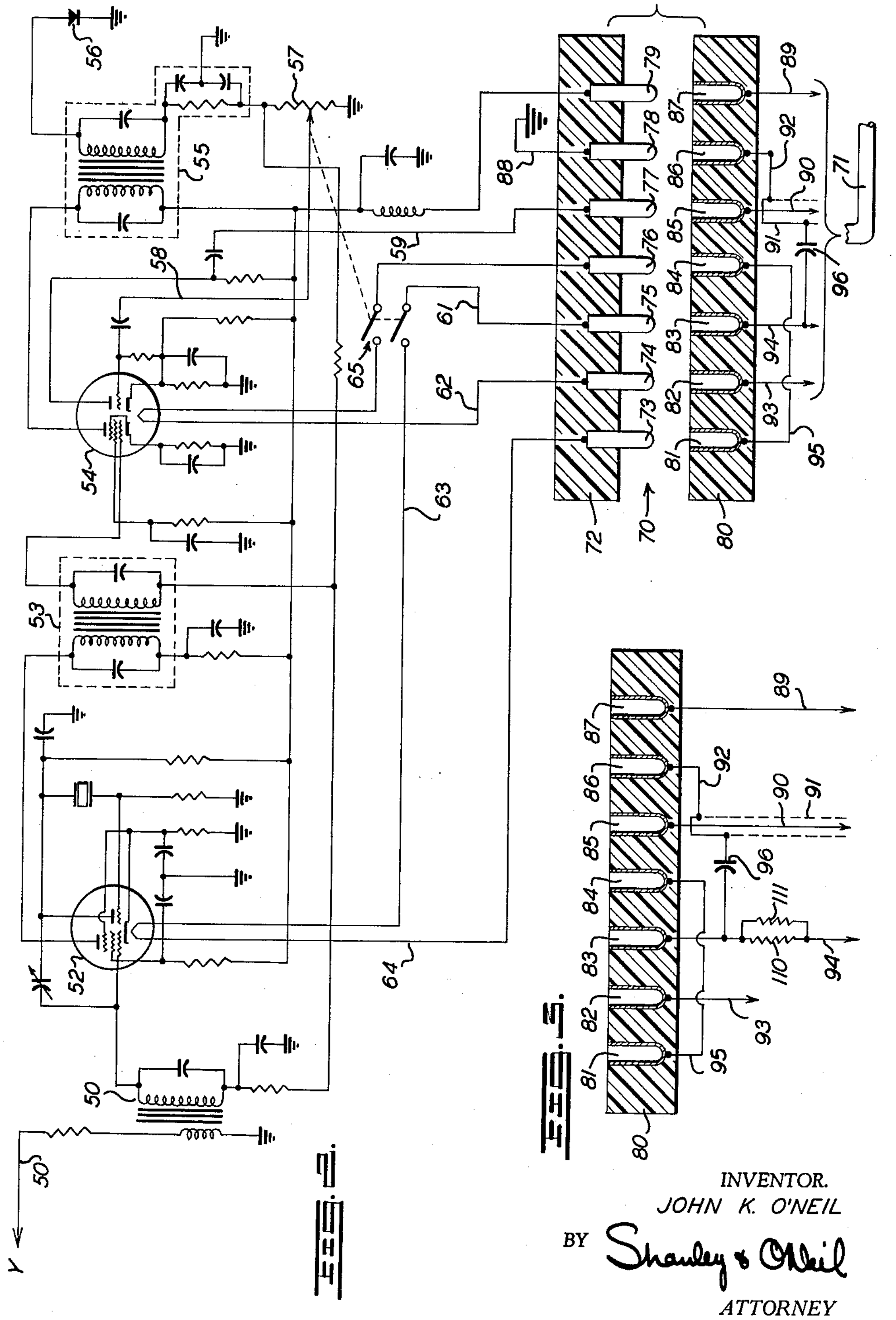

A preselected receiving channel and the novel adaptor arrangement provided by the present invention may be used in connection with any conventional receiver operating as the parent receiver. However, in some cases it may be necessary to provide means to compensate for difference in voltage that may exist between that available in the parent receiver and that required by the preselected receiving channel. For example, the cable assembly shown in FIGURE 2 of the drawings is designed for operation with a parent receiver presenting a 12 volt direct current heater supply, the lead 95 connecting the female connectors 81 and 83 functioning to connect the heater elements of tubes 52 and 54 in series. The arrangement shown in FIGURE 3 is designed for use when greater heater voltage values are available in the parent receiver. In this arrangement the conductor 94 is provided with parallel resistances 110 and 111 to provide the required voltage. Of course, series resistors of the proper magnitude may be employed. The arrangement shown in FIGURE 4 is employed when a six volt direct current heater voltage supply is available. In the latter arrangement female connectors 81 and 86 are joined through lead 112 and female connectors 83 and 86 are joined through lead 113. In each of the foregoing arrangements condenser 96 may be deleted when alternating current supply voltages are available.

The present invention has been used in connection with maritime communication to solve a heretofore insurmountable problem which has arisen in view of certain Federal Communications Commission regulations. The Federal Communications Commission has designated four intership frequencies in the 1600–3500 kc. band, i.e., 2003 kc., 2638 kc. 2738 kc. and 2830 kc., and has established 2182 kc. as the calling and distress frequency. Rule 8.223 of the Rules Governing Stations on Shipboard in the Maritime Service requires that ship radiotelephone stations in the 1600–3500 kc. band must maintain an efficient listening watch of 2182 kc. while the station is open, and not transmitting on other frequencies. Of the intership frequencies, 2638 kc. may be used in all areas and accordingly this frequency is the most used frequency.

Before the present invention in order to meet these requirements two receivers have been employed, one tunable over the 1600–3500 kc. band and another pretuned to the distress frequency of 2182 kc. The requirement of two receivers is expensive and imparts space problems and makes it difficult to monitor the distress frequency. Also, the use of two receivers presents interference problems. Conventional marine radiotelephone receivers available and in use today include an IF amplifier operating on 455 kc. Thus the local oscillator of the receiver tuned to 2182 kc. operates at 2637 kc. in order to provide an intermediate frequency 455 kc. The local oscillator frequency of 2637 kc. is 1 kc. removed from most used intership frequency 2638 kc. and the receiver tuned to the latter frequency is rendered insensitive to weak signals due to automatic gain control activity and strong signals received at these frequencies are accompanied by a strong 1 kc. howl, as a result of radiation of the 2637 kc. from the local oscillator.

The present invention overcomes the foregoing problems. The preselected receiving channel shown in FIGURE 2 of the drawings comprises a compact unit mounted in a case 2" x 5" x 7" which may be easily located without presenting space problems. More important, however, the additional power requirements are not presented since the preselected receiving channel obtains its power from the radiotelephone receiver and the monitoring is made much easier inasmuch as only the audible signal source of the radiotelephone receiver is employed for the distress frequency or for any other frequency to which the radiotelephone receiver may be tuned. In addition, the preselected receiving channel provided by the present invention may be used in combination with conventional radiotelephone receivers without requiring modification of the latter by simply inserting the adaptor 36 of FIGURE 1 into the socket of the output tube of the conventional receiver in the manner described above, and by making a simple connection to the input signal source.

The present invention also solves the problem with respect to local oscillator interference. In the application of the present invention mentioned above the preselected receiving channel operates at an intermediate frequency of 262 kc., and the crystal controlled local oscillator is tuned to 2444 kc. The local oscillator frequency is so far removed from the most used frequency of 2638 kc., as well as from the other designed frequencies of the 1600–3500 kc. band, so that there is no interference problem due to radiation from the local oscillator even in connection with broad band receivers. Thus, the present invention has provided a relatively inexpensive, simply and easily adaptable arrangement that makes it possible to fully satisfy all of the requirements set by the Federal Communications Commission Rules and eliminates problems occasioned by the use of conventional equipment.

There is thus provided by the present invention a novel arrangement for using a channel tuned to receive a single preselected frequency in connection with a conventional receiver without modification of the latter and in which the power requirements of the preselected receiving channel are obtained from the power source of the conventional receiver and in which the output signal from the preselected receiving channel is fed to the audio frequency output of the conventional receiver. The foregoing is accomplished by the provision of a novel adaptor including a cable connected to elements of the preselected receiving channel, the adaptor being designed to be inserted into the tube socket for the output tube of the conventional receiver and to receive the output tube. The cable is designed in such a manner so that it may be modified when necessary to compensate for voltage differences between conventional receivers and the preselected signal channel. There is also provided by the present invention a novel arrangement for assuring reception of a preselected frequency in combination with a receiver designed to receive signals over a certain frequency band by which interference due to local oscillator radiation is completely eliminated.

Although only one embodiment of the invention has been disclosed and described herein, it is to be expressly understood that various changes and substitutions may be made therein without departing from the spirit of the invention as well understood by those skilled in the art. For example, the conductors of cable 71 may be directly connected to appropriate leads of the preselected receiving channel if desired, thus eliminating the plug and socket device 70. In the latter construction the various connections between the female connector of socket 80 would be provided within the preselected signal channel or within the cable. Reference therefore will be had to the appended claims for a definition of the limits of the invention.

What is claimed is:

1. Signal receiving system comprising receiver means including an output stage having socket means connected to power supply means and to audio output signal producing means, a receiving channel tuned to a preselected frequency including power consuming devices and means for producing a detected output signal, a plug device including a plurality of conductors and leads connected to the conductors, the plug device being inserted in the socket means of the receiver and adapted to support output tube means of the receiver, the conductors of the plug device forming connections between the power supply of the receiver and elements of the output tube means and with the audio signal output producing means, and the leads connected to the conductors of the plug device being connected to power consuming devices of the receiving channel and to the means for producing a detected output signal.

2. Receiving apparatus for use with a receiver operable to separately receive signals at a plurality of different frequencies and including a power supply and audio output signal producing means, comprising a receiving channel tuned to a predetermined frequency within the frequency band of the plurality of different frequencies, the receiving channel including a local oscillator producing oscillations at a frequency without the band of the plurality of different frequencies, means for mixing the signal at the predetermined frequency with the local oscillations to produce an intermediate frequency signal, means for amplifying and detecting the intermediate frequency signal, a plug and socket device having a plurality of pins adapted to enter openings of the output tube socket means of the receiver and a plurality of openings connected by conductors to the pins and adapted to receive pins of the output tube means of the receiver, and means for connecting the conductors of the plug and socket device to the receiving channel.

3. Apparatus for simultaneously receiving without interference two signals at different frequencies within the same frequency band; comprising a tunable receiver operable to separately receive signals at a plurality of selected frequencies within a frequency band; the tunable receiver including a power supply, audio output signal producing means, a local oscillator, and an intermediate frequency amplifier tuned to a specific frequency for reception of signals at the plurality of selected frequencies; a tuned receiving channel for receiving a signal at a predetermined frequency different from each of the plurality of selected frequencies and within the frequency band; the tuned receiving channel including local oscillator means, intermediate frequency amplifier means, and detector means; the local oscillator means of the tuned receiving channel being tuned to produce oscillations at a frequency outside the tuning range of each of the plurality of selected frequencies; the specific frequency of the intermediate frequency amplifier of the tunable receiver requiring the local oscillator of the tunable receiver to produce oscillations at frequencies outside the tuning range of the predetermined frequency upon the tunable receiver being tuned to receive signals at any one of the plurality of selected frequencies; means for feeding the output of the detector means to the audio output signal producing means of the tunable receiver; and means for connecting the power supply of the tunable receiver to the tuned receiving channel.

References Cited in the file of this patent

UNITED STATES PATENTS

| | | |
|---|---|---|
| 1,914,165 | Roberts | June 13, 1933 |
| 2,033,492 | Stone | Mar. 10, 1936 |

FOREIGN PATENTS

| | | |
|---|---|---|
| 535,106 | Great Britain | Mar. 28, 1941 |